April 14, 1925.  1,533,623
G. VIEL
TRANSMISSION OF ELECTRIC ENERGY
Filed Jan. 18, 1921
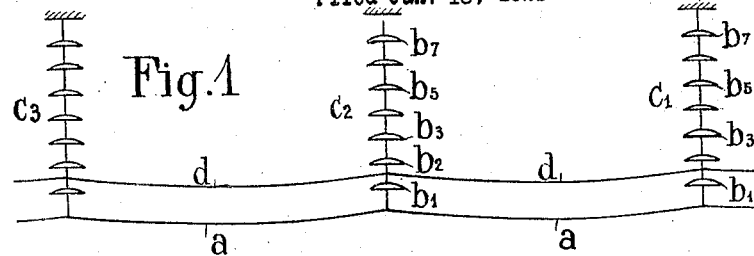
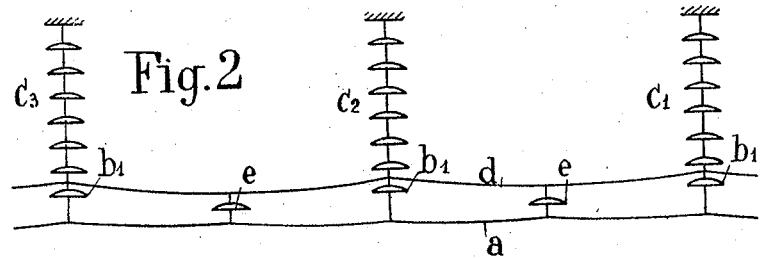
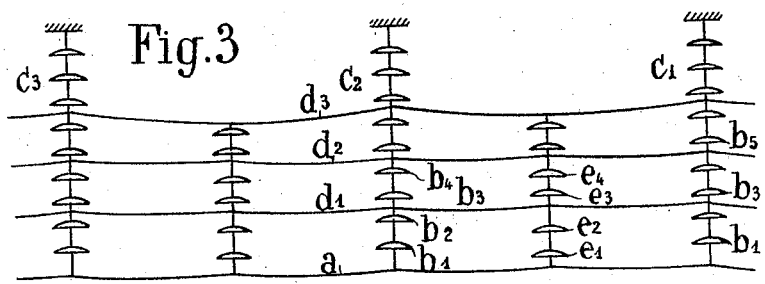
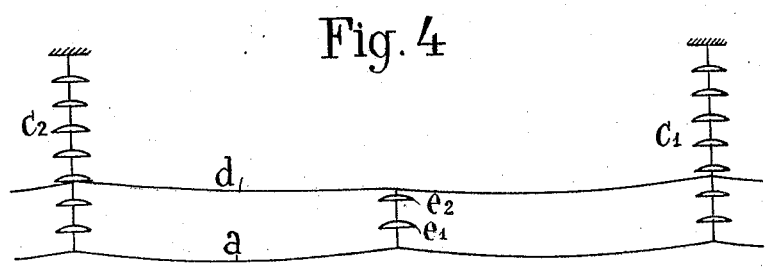
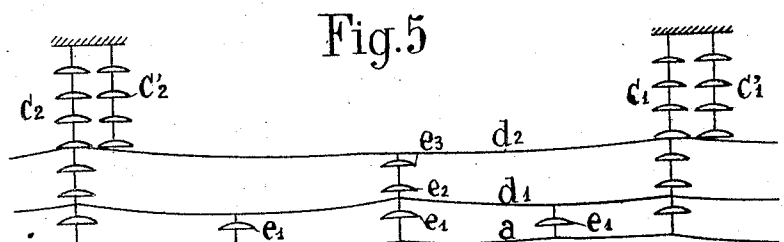
INVENTOR
Georges Viel
BY Townsend & Decker
ATTORNEYS Patented Apr. 14, 1925.

1,533,623

UNITED STATES PATENT OFFICE.

GEORGES VIEL, OF ST. ETIENNE, FRANCE.

TRANSMISSION OF ELECTRIC ENERGY.

Application filed January 18, 1921. Serial No. 438,111.

*To all whom it may concern:*

Be it known that I, GEORGES VIEL, of St. Etienne, Loire, France, have invented new and useful Improvements in the Transmission of Electric Energy, which improvements are fully set forth in the following specification.

The different elements forming a chain insulator (also termed suspended insulator) serving for the suspension and insulation of cables for the transmission of electric energy are subjected to very unequal differences of potential. At the terminals of the first element in contact with the cable there is a difference of potential much greater than that present at the terminals of the second and so on.

Most of the elements therefore are of little use and whatever may be their number it is not possible sufficiently to relieve the strain upon the first which is destroyed either by old age or by an excess voltage.

The voltage it is possible to employ in transmission is for this reason limited.

This invention obviates these objections. It has for object to distribute the potential between the various elements of the chain according to any desired law whether uniform or not.

According to this invention elements of the same order or position in the respective series of elements making up the various chains or series supporting the transmission line are connected by one or more insulated metal cables or balance cables over a suitable length dependent on the difference of potential which it is desired to maintain at the terminals of each of the elements of the different chains.

The balancing cable in question may also serve as a suspending cable for the power cable thereby allowing power cables to be made of very ductile metals and with the use of large spans.

The invention is illustrated in the accompanying drawings.

Fig. 1 illustrates the principle of my invention in its simplest form.

Fig. 2 shows the use of intermediate elements located between the chains constituting the main points of suspension for the line.

Fig. 3 illustrates the invention carried out with several balance wires or insulated cables and with a modification in the elements interposed between the points of suspension of the line.

Figs. 4 and 5 illustrate further modifications.

In these figures $a$ is a high voltage power line. $b^1$, $b^2$, $b^3$ are a series of insulators on each of the chains $c^1$, $c^2$, $c^3$, which support the line $a$.

Parallel with the line $a$ is stretched (Figure 1) a metal cable $d$ which connects the insulators $b^1$ of the same order or position in the several series making up the various chains $c^1$, $c^2$, $c^3$. The assemblage of the two lines $a$ and $d$ and the elements $b^1$ form a condenser whose capacity is equal to the capacity of the connected elements $b^1$ arranged in parallel plus that of the two parallel wires $a$ and $d$. The capacity of such condenser system is therefore proportional to its length and to the number of elements connected.

Due to the condenser capacity effect the difference of potential at the terminals of the elements $b^1$ decreases as the length of the insulated cable $d$ increases and consequently as the number of the elements $b^1$ arranged in parallel is greater. The effect is that the difference of potential or voltage on the units of the chain or string tends to be transferred to the other elements $b^2$, $b^3$, of the chain. The longer the cable the greater the tendency of the difference of potential between the two cables towards zero.

The insulated cable or balancing cable $d$ is therefore divided up in such a manner that the difference of potential may be maintained in each element of the chain at the desired value neither too high nor too low. Practically the losses by conductance will tend like as the capacities to diminish the difference of potential between the power cable $a$ and the balance cable $d$. This should be taken into account when determining the length of the various sections of the balance cable.

In order to prevent the power cable $a$ coming into contact with the balance cable $d$ the first element $b^1$ of the chain is shown in Figure 2 at a suitable distance from the line $a$ or one or more elements may be interposed between the points of suspension of the system $a$ $d$ so that the capacity of the system is still further increased.

The arrangement above described is also of course applicable not only to the element $b^1$ but also to any one of the elements $b^2$, $b^3$ etc. forming the chain with the object always of diminishing the difference of potential at the terminals of these elements. Thus for a line of very high voltage several balance wires $d^1$, $d^2$, $d^3$, may be employed as shown in Figure 3; they are insulated from each other and connect together elements of the same order or position in the series of each of chains $c^1$, $c^2$, $c^3$, which support the same power line $a$. Intermediate superposed elements $e^1$, $e^2$, $e^3$, etc. may also be interposed between the points of suspension of the system $a$ $d^1$, $d^2$, $d^3$ in order to avoid contact between the cables.

The balance cable or cables may serve not only to distribute potential between the different elements but also as a suspending cable for the power cable $a$ as shown in Figures 4 and 5. The chains $c_2$ $c_1$ etc. may then be spaced and large spans employed even when very ductile metals such as aluminium for example are used for the power cable $a$. In this case the insulated cable $d$ (Figure 4) or cables $d^1$, $d^2$ (Figure 5) are formed of steel for example and supported as shown in Figure 4 by a mechanically reinforcing insulator or by double chains $c^1$, $c'^1$, $c^2$, $c'^2$ etc. (Figure 5).

In a general manner the balance cable or cables form an excellent wave damper and have the best neutralizing effect on excess voltage.

What I claim is:—

1. In the transmission of electric energy the combination with the line wire, a series of chain insulators supporting said line wire and an insulated cable connecting together elements of the chains of the same order or position in each chain over a length dependent on the difference of potential to be maintained at the terminals of such elements.

2. In the transmission of electric energy the combination with the line wire, a series of chain insulators supporting said line wire and a plurality of insulated cables said insulated cables connecting together elements of the chains of the same order over a length dependent on the difference of potential to be maintained at the terminals of such elements.

In testimony whereof I have signed this specification.

GEORGES VIEL. [L. S.]

In presence of:
GEORGES HENRI VALLET,
AUGUSTE BANAIT.